Figure 1:
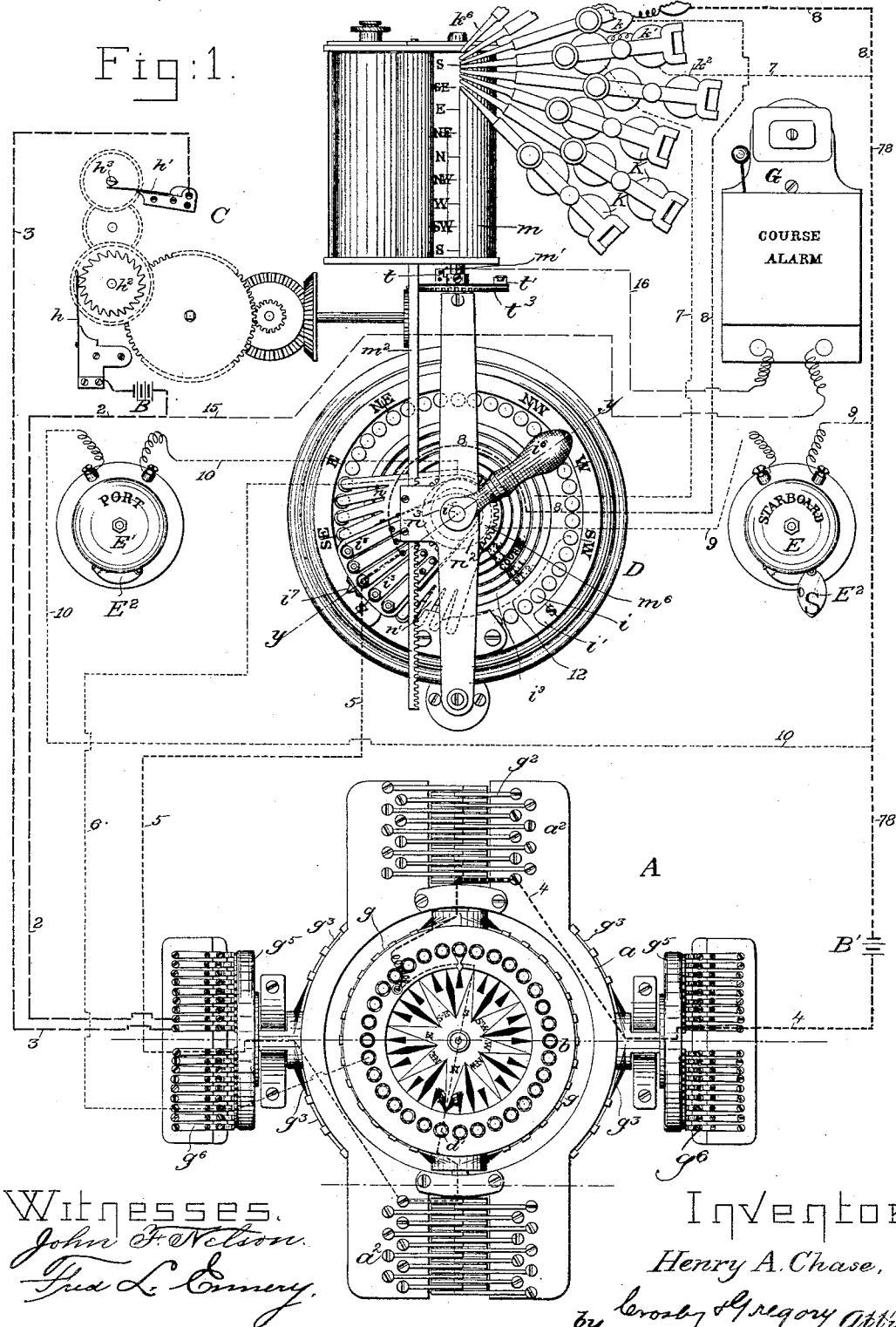

(No Model.) 3 Sheets—Sheet 1.

H. A. CHASE.
MARINER'S RECORDING COMPASS.

No. 385,042. Patented June 26, 1888.

Witnesses.
John F. Nelson.
Fred L. Emery.

Inventor.
Henry A. Chase,
by Crosby & Gregory Att'ys (No Model.) 3 Sheets—Sheet 2.
H. A. CHASE.
MARINER'S RECORDING COMPASS.
No. 385,042. Patented June 26, 1888.
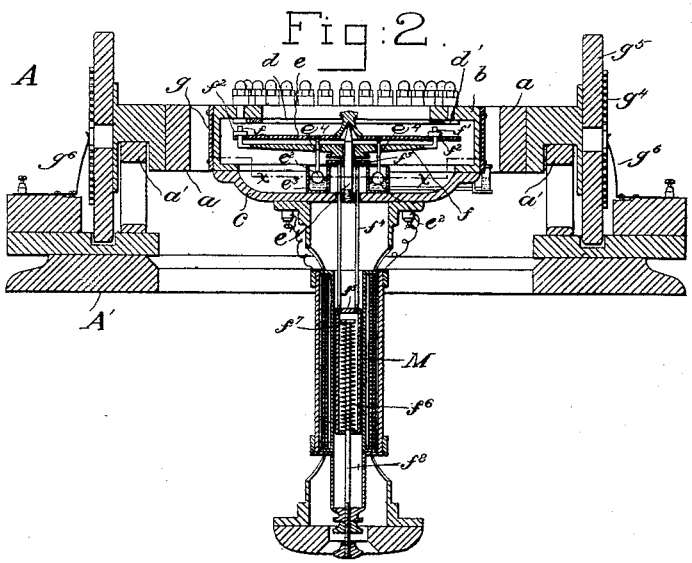
Fig: 2.
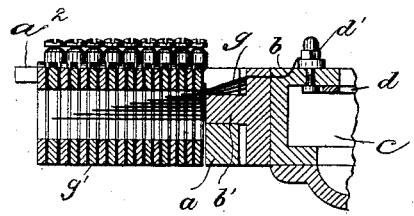
Fig: 3.
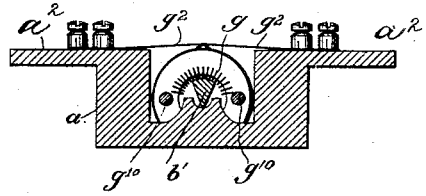
Fig: 4.
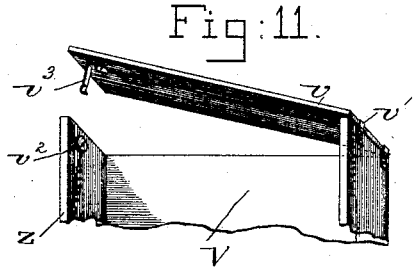
Fig: 11.
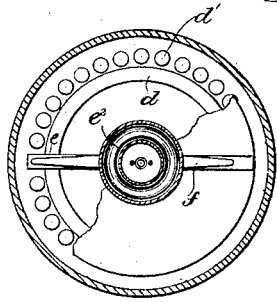
Fig: 5.
Witnesses.
John F. Nelson.
Fred L. Emery.
Inventor.
Henry A. Chase,
by Crosby & Gregory, Att'ys.
N. PETERS, Photo-Lithographer, Washington, D. C.

(No Model.) 3 Sheets—Sheet 3.
H. A. CHASE.
MARINER'S RECORDING COMPASS.
No. 385,042. Patented June 26, 1888.
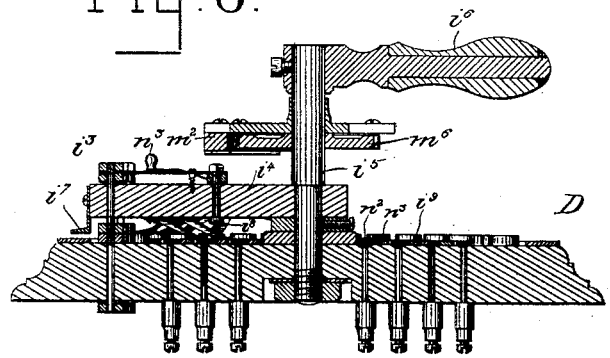
Fig: 6.
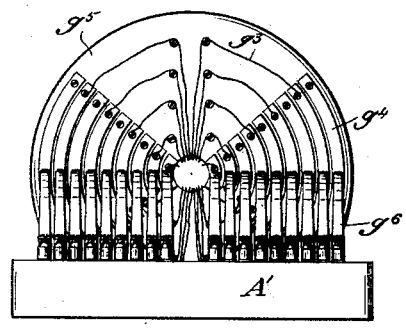
Fig: 7. Fig: 8. Fig: 9.
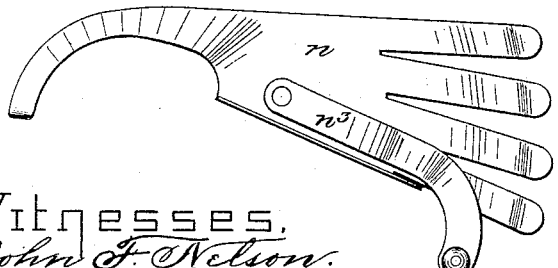
Fig: 10.
Witnesses,
John F. Nelson.
Fred L. Emery.
Inventor.
Henry A. Chase.
by Crosby & Gregory. Att'ys

UNITED STATES PATENT OFFICE.

HENRY A. CHASE, OF STONEHAM, MASSACHUSETTS.

MARINER'S RECORDING-COMPASS.

SPECIFICATION forming part of Letters Patent No. 385,042, dated June 26, 1888.

Application filed July 10, 1885. Renewed July 13, 1887. Serial No. 244,142. (No model.)

*To all whom it may concern:*

Be it known that I, HENRY A. CHASE, of Stoneham, county of Middlesex, State of Massachusetts, have invented an Improvement in Compasses, of which the following description, in connection with the accompanying drawings, is a specification, like letters on the drawings representing like parts.

My invention is embodied in an apparatus for indicating and recording the movements of a magnetic needle or other needle or pointer, being shown in this instance as used in connection with a mariner's compass, the apparatus operating to produce an alarm in case the vessel deviates from the course set by the officer beyond a certain predetermined limit, and also producing a graphic record of the course of the ship for any desired length of time.

The invention is also applicable to a galvanometer-needle or similar instrument for the purpose of indicating and recording the deviations of said galvanometer-needle, or to any pointer or indicator having a variable movement with relation to a surrounding case or frame-work, depending on changes of condition that it is desired to record.

The invention consists partly in the combination, with a compass-needle or similar device having a directive influence acting upon it, by means of which it has a real or apparent movement with relation to the case or frame-work surrounding it, of a series of electric circuits having terminals in or near the path of movement of the said needle, and a circuit-controlling device, the position of which with relation to the said circuit-terminals or surrounding frame-work is controlled by and corresponds with that of the needle, the said circuit-controlling device being operated from time to time to affect the circuit the terminal of which is at that time adjacent to the end of the needle. The different circuits thus correspond with the different positions of the needle that it is desired to record, the number of said circuits depending upon the minuteness of the movement of the needle that it is desired to record, being shown in this instance as thirty-two in number, and thus indicating movements of the needle amounting to eleven and one-fourth degrees, or one "point," to use the nautical term. It will be understood that if each of the said circuits contained a recording device—such, for instance, as an electro-magnet operating a stylus or other marking device—each in a different position, or on a different line on a recording-surface—such as a sheet of paper traveling at a uniform rate of speed—a record would be made each time the circuit was closed by the instrument controlled by said circuit, thus indicating that the needle was in a position corresponding to the said circuit; or, in other words, if, as herein shown, the paper were in the form of a continuous band ruled with thirty-two lines, corresponding to the points of the compass, the record would show which point the needle was on at each operation of the circuit-closer.

As the deviation of the vessel from its course will usually be only one or two points at the most, and as the vessel will usually remain on one course for a considerable length of time, the apparatus, instead of containing a recording-instrument for each circuit, may contain only a small number of recording-instruments—namely, from one to five—and a switch which will connect one of said recording-instruments with the circuit corresponding to the course on which the vessel is to be steered, and the additional recording-instruments at either side with the circuits corresponding to the deviations of the vessel from said course in either direction, the said switch being also connected with the recording-strip of paper in such a manner that the latter will be moved so as to bring the lines corresponding with the points that are placed in circuit in position to be acted upon by the corresponding recording-instruments.

In order to indicate by a suitable signal or alarm whenever the vessel deviates from the course set beyond a predetermined limit, a number of circuits at either side of those containing the recording-instrument are placed in connection with an audible-signal instrument or alarm, so that if the needle deviates beyond the one or two points that are connected with the recording-instruments the circuit of the alarm will be affected and the alarm operated, and, preferably, there are two alarm-instruments, one operated when the deviation is in one direction and the other when it is in the other direction, they, preferably, also operating visual indicators which remain displayed to show which instrument has been operated after the alarm ceases to sound.

In order to make the apparatus complete for nautical use, an alarm-instrument is provided controlled by a circuit-closer governed by a clock or motor, which may be the one that controls the recording mechanism, which circuit-closer may be set to operate the said alarm after the vessel has remained on one course for any desired length of time, and recording-instruments are also provided for indicating the number of revolutions of the propeller-shaft, and also for recording the indications of the log, and in order that the movements of the recording-paper may be known with extreme accuracy a recording device operating thereon may be connected with the chronometer and operated at definite periods of time—for instance, once an hour.

The invention further consists in various combinations of the above-mentioned devices and in details of construction hereinafter described.

Figure 1 is a diagram view showing the various parts of the apparatus for indicating and recording the movement of a needle or pointer embodying this invention, being shown as arranged for use on shipboard to indicate and record the course of the vessel, the compass being shown in plan view. Fig. 2 is a vertical section of the compass, showing the circuit-controlling device; Figs. 3 and 4, a longitudinal and transverse section, respectively, through the bearing or gimbal-joint of the inner ring of the compass-frame; Fig. 5, a horizontal section on line $x$, Fig. 2, below the compass-needle, looking upward; Fig. 6, a longitudinal section on line $y$, Fig. 1, of the switch by which the recording-instruments are placed in connection with different sets of the circuits, the terminals of which surround the needle, as desired; Fig. 7, an end elevation of the circuit-connecting devices carried by the outer ring of the compass-supporting frame; Figs. 8 and 9, details of the circuit-controlling device for the signaling-instrument or alarm operated after the vessel has been on one course for a given length of time; and Fig. 10, a detail of one of the circuit-connecting devices for the alarm-instrument which indicates too great deviation of the vessel from the course set by the officer. Fig. 11 is a detail of a part of the box containing the indicating and registering devices removed from Fig. 1.

The compass A is supported from the binnacle or frame A', fixed with relation to the vessel on a gimbal-joint, the outer ring, $a$, of which is pivotally supported or hung on suitable bearings, $a'$, (see Fig. 2,) resting on the frame-work A', and the inner ring, $b$, of which has pivoted bearing $b'$ (see Figs. 3 and 4) in the outer ring, $a$, at right angles to the pivot-bearings of the outer ring, so as to afford a universal movement of the compass-box $c$, Fig. 2, connected or made integral with the inner ring, $b$. The said inner ring, $b$, is provided with a contact-piece or ring, $d$, (see Figs. 2, 3, and 5,) extending wholly around it, and a series of contact-pieces or circuit-terminals, $d'$, arranged at different distances apart around said ring and insulated therefrom, being shown in this instance as thirty-two in number, corresponding in position with the points of the compass.

The needle $c$, provided with the usual card having points marked thereon, as shown in Fig. 1, is mounted on a pivot, $e'$, fixed in the box $c$, and, as shown in this instance, is provided with an annular float, $e^2$, resting in an annular cup, $e^3$, containing mercury or other heavy fluid, which sustains the greater portion of the weight of the needle, so that the pivot $e'$ merely has to prevent lateral movement of the needle or define the center of its oscillatory movements. When a compass-needle is pivoted or suspended at a single point, as usually practiced in mariner's compasses, and is properly balanced when the vessel is in a horizontal position, there will be a greater or less tendency of the needle to dip or turn in a vertical plane as the vessel oscillates about it, and thus varies the position of the surrounding masses of iron with relation to the needle. In order to diminish or prevent this dipping, the float $e^2$ is connected with the needle by supports $e^4$, which are fastened to the needle at some distance from its pivot, so that as the float $e^2$ tends to remain in a horizontal position independently of the oscillations of the vessel about it, it will by its buoyancy and weight tend to retain the needle also in a horizontal position, and will thus almost entirely prevent the dipping of the needle.

The needle $e$ is provided with a circuit-controlling device, $f$, shown as a bar substantially parallel with a needle, having fingers $f'$ extending through holes in the needle and provided with collars $f^2$, by which the said circuit-controlling device $f$ is supported on or hung from the needle, turning freely with the same under the action of magnetism. The fingers $f'$ are in proper position to engage the contact-pieces $d\ d'$ when the device $f$ is raised or moved in the direction of the axis of the needle-pivot, thus forming an electrical connection, or completing the circuit between the contact-piece $d$ and whichever one of the contact-pieces $d'$ happens to be above the finger $f'$ when the device $f$ is raised. It will be seen that the movement of the device $f$ for thus closing the circuit is independent of its angular movement with the needle, and may be accomplished without affecting the angular position of the needle with relation to its supporting frame-work. The circuit-controlling device $f$ is thus raised from time to time to complete the circuit between the contact-pieces $d\ d'$ by means of a lifting device, $f^3$, (see Fig. 2,) shown as a ring or collar surrounding the needle-pivot and connected by means of rods $f^4$ with the armature or core $f^5$ of a solenoid or electro-magnet, M, the said core being shown in this instance as hollow and containing a retracting-spring, $f^6$, acting between the lower end of the core and a collar or head, $f^7$, on a rod, $f^8$, extending to the lower end of the solenoid or magnet, and threaded for the purpose of adjusting the force exerted by the spring.

The axis of the magnet or solenoid is coincident with that of the needle-pivot, so that no directive or disturbing influence is produced on the said needle by the said magnet.

The terminal wires or conductors of the solenoid or magnet M, as well as those leading from the contact-pieces $d\ d'$, extend around the ring $b$, as shown at $g$, to the pivot or bearing of said ring, at which the said wires $g$ are extended out and connected with a series of conducting-rings, $g'$, connected with the ring $b$ by pins $g^{10}$, Fig. 4, and concentric with its axis of oscillation, as best shown in Fig. 5, the said rings being insulated from one another and co-operating with a series of springs, $g^2$, connected with projections $a^2$ from the ring $a$, so that electrical connection is maintained between the contact-pieces on the inner ring and the springs $g^2$ on the outer ring without interfering with the oscillation of the former in the latter. These springs $g^2$ are connected by independent wires extending around the outer ring, $a$, as shown at $g^3$, with a series of concentric contact-pieces, $g^4$, on plates $g^5$ (see Fig. 7) concentric with the axis or pivot-bearings of the outer ring, $a$, the said contact-pieces $g^4$ co-operating with contact-springs $g^6$, which are thus maintained in electrical connection with the various conductors on the inner ring without interfering with the universal movement of said inner ring and compass-box with relation to the outer frame-work, A', upon which the springs $g^6$ are supported, so that the various circuits can be extended from the inner ring, through the connections just described, to the springs $g^6$ and thence to any desired part of the vessel.

The terminals of the solenoid or magnet M are connected in circuit with two of the springs $g^6$, from which the circuit is continued by conductors 2 3 (see Fig. 1) to the battery B and circuit-controlling devices $h\ h'$ co operating with a clock or motor, a portion of which is shown at C, Fig. 1, the contact-spring $h$ co operating with a toothed wheel, $h^2$, connecting it in circuit with the clock during certain intervals of time, and the spring $h'$ co operating with a contact on a more rapidly moving arbor, $h^3$, which will come in contact with the spring $h'$ for a short interval during the period in which the spring $h$ is in contact with the wheel $h^2$, during which interval the circuit of the battery B will be closed through the magnet M, which will then raise the device $f$, which will complete a circuit between the ring $d$ and that one of the contact-pieces $d'$ which then happens to be over the finger $f'$ of the said device $f$.

The clock-controlled circuit-closer may be properly constructed to retain the circuit of the magnet M closed for any desired interval of time, during which the needle will be positively locked, so as not to respond to the directive influence of magnetism.

The ring $d$ is connected by conductor 4 (see Fig. 1) with one pole of the battery B', and it will be understood that if a series of independent branch circuits extended from the contact-pieces $d'$ and springs $g^5$ through independent instruments to the other pole of the battery B' one of the said circuits would be closed and the instruments therein affected when the controlling device $f$ is raised, the said controlling device practically constituting a key controlling the various branch circuits of the battery B'.

As the apparent movement of the needle will only vary a few points one way or the other during a given interval of time while the vessel is on one course, it is unnecessary to have all the points $d'$ connected with complete circuits provided with separate instruments for indicating or recording when one of the said circuits is closed, provided that suitable indicating or recording instruments may be placed in connection with the points that the device $f$ is likely to touch during any ensuing interval of time, or while the ship is intended to remain on one course.

In order to thus connect the points $d'$ corresponding to any particular course, and a sufficient number of points at either side thereof, in circuit with suitable signaling or recording instruments, the entire series of points $d'$ are connected, respectively, by conductors 5 6, &c., two only of which are shown, with a corresponding series of points or contact-pieces, $i$, on a switch-board or circuit-connecting device, D, (see Fig. 1,) shown as circular in form to correspond in general appearance with the compass, and provided with an indicating-plate, $i'$, marked to correspond with the points of the compass, each mark being opposite that one of the contact-pieces $i$ which is connected in circuit with the contact-piece $d'$ that will be touched by the controlling device $f''$ when the ship is on the course indicated by said mark. For instance, as shown in Fig. 1, the vessel is on a course south by east, the indicating-point $i^2$, being opposite the point south by east of the needle-card and the contact-piece $d'$ opposite the north end of the needle, which will be the one touched by the finger $f'$ of the device $f$, is connected by conductor 5 with the contact-piece $i$ of the board D that is shown by indicator $i^2$ to represent south by east, being the next one toward the east from the letter S on the said indicating-ring $i$.

From the contact-pieces $i$ the circuits are continued to a series of contact-pieces, $i^3$, (shown in this instance as five in number,) movable around the switch-board D, being connected with an arm, $i^4$, (see Fig. 6,) on shaft $i^5$, provided with a handle, $i^6$, by which it may be turned to place the contact-pieces $i^3$ on any desired series of the contact-pieces $i$, according to the course of the vessel. The arm $i^4$ is provided with an indicating-point, $i^7$, opposite the middle one of the contact-pieces $i^3$, and the officer, upon instructing the steersman what course to pursue, will move the handle $i^6$ until the said point $i^7$ comes opposite the point on the indicator $i'$ corresponding to said course—for instance, south by east, as shown in Fig. 1. The contact-pieces $i^3$ are connected by suitable springs, $i^8$, (see Fig. 6,) with a series of concentric rings, $i^9$, from which the circuits are continued through different indicating or signaling instruments to the opposite pole of the battery B' to that connected with the ring $d$. For instance, the middle contact-piece, $i^3$, is connected with the ring $i^9$, marked "Course," (see Fig. 1,) since, when the circuit through the said middle spring and ring is complete, it will indicate that the vessel is on the course set by the officer, or that the needle is in what may be called the "normal" position for the time being.

The rings $i^9$, at either side of the one marked "Course," are marked to indicate point one and point two—port and starboard, respectively—as they are connected with the points $d'$ of the compass that will be touched when the vessel has deviated one or two points in either direction from the course. The circuits from the rings $i^9$ are completed by conductors 7 8, &c., to the magnets $k$ $k'$ $k^2$, &c., of registering or indicating instruments of any suitable or usual construction, from which the circuit is continued by conductors 7 8 to the pole of battery B' opposite to the one connected to the contact-ring $d$ in the compass. As shown in this instance, the armatures of the magnets $k$ $k'$, &c., are provided with a marking device, $k^6$, which acts on a traveling recording-surface, $m$, which may consist of a long ribbon of paper moved at a uniform rate by the clock C or other suitable motor, the said paper being ruled with longitudinal lines marked as shown in Fig. 1, to correspond with the different points of the compass.

In order that the proper lines on the recording surface may be brought opposite the markers $k^6$, to correspond with the points indicated by the compass when the circuits of the magnets of the said recording-instruments are closed, the drum or cylinder by which the recording-surface $m$ is moved is longitudinally movable on its actuating shaft $m'$, being splined thereon, and the frame-work carrying the said drum is connected by a rack-bar, $m^2$, (see Fig. 1,) with a gear, $m^6$, on the shaft $i^5$ of the switch, so that whenever the said switch is moved to place the magnets $k$ $k'$, &c., in circuit with the compass the line on the recording-surface $m$ corresponding to the point on the indicator $i$ to which the pointer $i^7$ is moved will be placed opposite the marking device of the magnet in circuit with the middle contact-piece, $i^3$, which will be the circuit closed by the device $f$ if the vessel is on her course, so that the record made on the paper $m$ will be on the line marked to correspond with the course on which the vessel was when the record was made, and if the vessel were off the course one or two points the record would be made by the magnets $k'$ or $k^2$ at the proper position on the surface $m$ to indicate such variance of the vessel.

In order to sound an alarm or produce a signal that will at once attract attention in case the vessel deviates from her course more than the two points in either direction, connected with the circuit-closers $i^3$, and through them with the magnets $k'$ and $k^2$, any desired number of points $i$ at either side of those connected with the pieces $i^3$ are placed in connection by suitable contact-pieces, $n$ $n'$, only one of which is shown, (see Fig. 10,) with rings $n^2$ $n^3$ of the switch-board D, from one of which the circuit is completed by conductor 9, through a signaling-instrument, E, and from the other of which rings the circuit is continued by conductor 10, through the signaling-instrument E', to the battery B', the said instruments E E' being placed in a circuit, respectively, according as the deviation of the vessel is in one or the other direction, and being marked "Port" and "Starboard," so that when one of the said signals is operated it will be known whether the vessel has deviated to port or starboard.

The signaling-instruments E E' are shown as vibrating bells of usual construction, and are also provided with visual indicators or drops E², which come into view when the alarm is operated, as shown on signal marked "Starboard," Fig. 1, so that the person whose attention is called by the ringing of the bell may know which signal was operated, in case its operation ceases before the person arrives at the signal.

When it is desired to have the signals E E' operated upon a smaller deviation of the vessel from her course, they may be connected in circuit with one or both the contact-pieces $i^3$ at the sides of the middle contact-piece, by means of a switch, $n^3$, (see Figs. 6 and 10,) which forms electrical connection between the said springs $i^3$ and the contact-pieces $n$ $n'$.

As in the construction of the switch and recording-instrument shown the handle $i^6$ does not revolve wholly around, additional contact-pieces are provided between the two points marked "S," to receive the contact-pieces $i^3$ and $n$ when the switch is in or near its extreme position—for instance, when in the position shown in Fig. 1. The third spring of the piece $n'$ is four points west of the point marked "South" going around from the east; or, in other words, the contact-piece $i$ beneath the third point should represent southwest, and it is connected with the one marked "Southwest" by wire 12, so that in case the vessel should deviate to the southwest course the device $f$ on rising would touch the contact-piece $d'$, connected with the contact-piece $i$, opposite the mark "S W," from which the circuit would be continued by wire 12 to the spring $n'$, so that the starboard-alarm would be operated, as it should be. In a similar manner the points $i$ between "S W" and "S" are connected with a series of points beyond the mark "S" on the other side of the switch-board, and the points between "S" and "S E" are connected with the points beyond the mark "S" on the opposite or west side of the switch-board. After the officer has given instructions to the steersman and set the switch-board to correspond with any desired course, he may desire to be notified or reminded when the vessel has remained on the said course for a definite period of time, and to provide for this the apparatus comprises a course-alarm, G, (see Fig. 1,) shown as consisting of a vibrating bell, one terminal of which is connected by conductor 15 with one pole of battery B, and the other terminal of which is connected by conductor 16 with a contact-piece, $t$, adapted to be engaged by a contact-piece, $t'$, (see Figs. 8 and 9,) connected with a plate, $t^2$, on the gear $t^3$, actuated by the clock C, which drives the shaft $m'$ of the recording apparatus. The said plate $t^2$ is movable independently of the gear $t^3$, and is provided with an engaging-projection, $t^4$, which may be placed in any desired one of a series of recesses, $t^5$, in the gear $t^3$, thus placing the contact-piece $t'$ at any desired distance from the one $t$, so that it will require a corresponding interval of time to bring the contact-piece $t'$ around to the contact-piece $t$ in the revolution of the gear $t^3$. As shown in this instance, the gear $t^3$ is arranged to make one revolution in twelve hours, and the disk $t^2$ is marked from one to twelve, so that by turning the said disk so as to bring any desired number opposite the contact-piece $t$ the contact-piece $t'$ will be placed in the position to occupy the same number of hours in arriving at the contact-piece $t'$, which is electrically connected with the frame-work of the clock and the disk $h^2$, so that while the contact-pieces $t$ $t'$ are engaged in the rotation of the disk $t^2$ the circuit 15 16 of the course-alarm will be closed while a tooth of the disk $h^2$ is in engagement with the spring $h$, thus sounding the alarm G for a suitable interval of time.

The recording-surface $m$ might be employed to register other conditions of the vessel besides its course or direction, by means of additional recording-instruments K, Fig. 1, one of which may, for instance, be connected with the revolution-counter of the engine, making a mark at every one hundred or one thousand revolutions, as may be desired; and another may be connected with the log, making a mark for every knot or other desired distance; and another may be connected with the chronometer, so as to indicate the time with greater precision than can be attained by the movement of the clock C.

If the recording-surface should be moved by turning the handle $i^6$ at the moment when one of the recording-instruments or markers is in engagement with the said surface, the recording-paper might be torn or the instrument bent or injured, and in order to prevent such an accident from occurring the handle $i^6$, or the entire instrument D, might be inclosed in a box, V, (see Fig. 11), having a movable door or cover, $v$, (shown as hinged at $v'$,) said cover controlling the circuit of the instruments K $k$ $k'$ $k^2$, &c., either directly or secondarily, by controlling the circuit 2 3 of the magnet M, or otherwise. As shown in this instance, the said box or case is provided with a circuit-closer, $v^2$ $v^3$, one member of which is connected with the body of the case and the other with the movable cover in such manner that when the said box is opened to afford access to the handle $i^6$ the circuit controlled by circuit-closer $v^2$ $v^3$ will be open.

The circuit-closer $v^2$ $v^3$ will preferably be included in the wire 7 8, common to all the recording-instruments, so that when the said box is opened none of the said circuits can be completed, and consequently none of the said instruments can be operated until after the handle $i^6$ has been moved to the desired position and the box-door again closed. If desired, the circuit-closer $v^2$ $v^3$ might be included in the circuit 2 3 of the magnet M, or a series of the said circuit-closers may be employed, one controlling the circuit of each indicating-instrument, or a circuit controlling that of one of the said indicating-instruments, or a series thereof.

It is obvious that the apparatus is capable of numerous modifications. For instance, instead of having an independent circuit-closer, $f$, angularly movable with the needle, the said needle might itself be moved bodily in line with the axis of its pivot, to complete a circuit from side to side of the gimbal-ring, the said needle either being lifted off from its pivot by the lifting device $f^3$ engaging it around said pivot, or the pivot itself being moved longitudinally, as shown and described in a previous application, Serial No. 156,097, filed by me February 16, 1885.

Instead of having the rubbing-contacts between the conductors on the different gimbal-rings, conductors might be employed of sufficient flexibility to admit of a universal movement of the compass-box with relation to the external casing or frame-work.

Instead of the recording-instruments shown, the current might make a record by chemical action, and the term "recording-instrument" is intended to include means or instrumentalities of this kind.

The invention, or portions thereof, are capable of various applications other than the particular one herein shown and described, the main feature of the invention consisting in a circuit-controlling device or key which is sensitive to or has its position varied by changes of condition that it is desired to indicate, and which co-operates with a series of different electric circuits in different positions, and also has a movement to control the said circuits which does not interfere with its sensitiveness to the influences by which its change of position is effected.

I claim—

1. The combination of a movable needle or pointer with a series of electric circuits having terminals in different positions within the range of movement of said needle or pointer, and a circuit-controlling device movable with the said needle or pointer and having an independent movement affecting the said circuits, the circuit at any time affected thus indicating the position of the needle or pointer at that moment, substantially as described.

2. A movable needle or pointer and series of electric circuits having terminals in different positions with relation to said needle or pointer, combined with a circuit-controlling device co operating with the said circuit-terminals, having a movement corresponding with that of the needle or pointer, and a signaling-instrument connected in circuit with one or more of said terminals, whereby if the needle or pointer and circuit-controlling device move to a predetermined position the said signaling-instrument will be operated, but not otherwise, substantially as described.

3. A movable needle or pointer and series of electric circuits having terminals in different positions with relation to said needle or pointer, combined with a circuit-controlling device co operating with the said circuit-terminals having a movement corresponding with that of the needle or pointer, and recording-instruments in one more of said circuits, whereby a record may be made of the position of the needle or pointer, substantially as described.

4. A movable needle or pointer and series of electric circuits having terminals in different positions with relation to said needle or pointer, combined with a circuit-controlling device co operating with the said circuit-terminals, having a movement corresponding with that of the needle or pointer, and a series of recording-instruments and circuit connecting device or switch-board by which said instruments are connected in circuit with any desired series of the said circuit-terminals co-operating with the controlling device governed by the needle or pointer, substantially as described.

5. A movable needle or pointer and series of electric circuits having terminals in different positions with relation to said needle or pointer, combined with a circuit-controlling device co-operating with the said circuit-terminals having a movement corresponding with that of the needle or pointer, and a series of recording-instruments and circuit-connecting device or switch-board, by which said instruments are connected in circuit with any desired series of the said circuit-terminals, and a recording-surface having a uniform or time movement, and connecting mechanism between the said recording-surface and the switch-board, whereby the position of the former relative to the recording-instruments is varied to correspond with the particular series of circuit-terminals at any time connected with the said recording-instruments, substantially as described.

6. A mariner's compass having a compass-box and pivotally supported rings, constituting a gimbal-joint therefor, combined with a series of circuit-terminals connected with the inner ring or compass-box, concentric with the axis of oscillation of the said needle, and conductors from said terminals passing from the inner ring to the outer ring and from the latter to the surrounding frame-work at the joints of said rings, substantially as described.

7. A mariner's compass having a compass-box and pivotally-supported rings, constituting a gimbal-joint therefor, combined with a series of circuit-terminals connected with the inner ring or compass-box concentric with the axis of oscillation of the said needle, and a series of contact-pieces connected with the said terminals and concentric with the axis of the supported member of the joint, and a series of contact-springs co-operating therewith on the supporting member of the joint, substantially as described.

8. In a mariner's compass, a compass-box provided with a vessel containing a liquid surrounding the needle-pivot, a needle, its pivot, and an annular float surrounding the said pivot and resting in the said liquid, combined with a circuit-controlling device having its position controlled by the said needle, and with a lifting device and actuating electro-magnet or solenoid therefor, to operate substantially as described.

9. The compass-needle having a free pivotal or angular movement, combined with a circuit-controlling device moved angularly with the needle, and means to move the said device in the direction of the axis of the angular movement of the needle, substantially as described.

10. The compass-needle having a free pivotal or angular movement, and a circuit-controlling device having its position controlled by the said needle, combined with a lifting device and actuating electro-magnet or solenoid therefor, having its axis coincident with that of the needle, substantially as and for the purpose described.

11. A movable needle or pointer and series of electric circuits having terminals in different positions with relation to said needle or pointer, combined with a circuit-controlling device co-operating with the said circuit-terminals, having a movement corresponding with that of the needle or pointer, and two independent signaling-instruments connected in circuit, each with one or more of the circuit-terminals at either side of the normal position of the needle, whereby deviation or apparent movement of the needle in each direction is indicated independently, substantially as described.

12. A movable needle or pointer and series of electric circuits having terminals in different positions with relation to said needle or pointer, combined with a circuit-controlling device co-operating with the said circuit-terminals, having a movement corresponding with that of the needle or pointer and a series of recording-instruments, and a circuit-connecting device or switch-board, by which said instruments are connected in circuit with any desired series of the said circuit-terminals, and a recording-surface having a uniform or time movement, and connecting mechanism between the said recording-surface and the switch-board, whereby the position of the former relative to the recording-instruments is varied to correspond with the particular series of circuit-terminals at any time connected with the said recording-instrument, and a clock or time-motor actuating the same, and a circuit-closer moved by said motor adapted to be set to operate at the end of any desired interval of time, and a signaling-instrument controlled thereby, substantially as described.

13. A movable needle or pointer and series of electric circuits having terminals in different positions with relation to said needle or pointer, combined with a circuit-controlling device co-operating with the said circuit-terminals, having a movement corresponding with that of the needle or pointer, and recording-instruments in one or more said circuits, whereby a record may be made of the position of the needle or pointer, and two independent signaling-instruments connected in circuit, each with one or more of the circuit-terminals at either side of those connected with the recording-instruments, whereby deviations of the circuits connected with the recording-instruments will be indicated, substantially as described.

14. A recording apparatus comprising a series of recording or marking instruments, and a recording-surface having a slow-timed movement with relation to the said instruments, and a shifting movement, by which different portions of its surface co-operate with the said instruments at different times, combined with shifting mechanism for changing the position of the said recording-surface, and a circuit-controlling device co-operating with the said indicating-instruments, and shifting mechanism, which prevents the indicating-instruments from being operated while the shifting mechanism is being moved, substantially as and for the purpose set forth.

15. A needle or pointer and an electric circuit and circuit-controlling device therefor, having a movement corresponding with the directive movement of the pointer, combined with an electro-magnet and clock or time-train controlling the circuit thereof, the said magnet being energized during definite intervals of time and moving the circuit-controlling device and locking the needle against movement by the directive influence acting on it, substantially as described.

In testimony whereof I have signed my name to this specification in the presence of two subscribing witnesses.

HENRY A. CHASE.

Witnesses:
   G. W. GREGORY,
   W. H. SIGSTON.